July 7, 1964
J. E. HORNER
3,140,003
TELESCOPIC BOAT TRAILER
Filed May 10, 1963
3 Sheets-Sheet 2
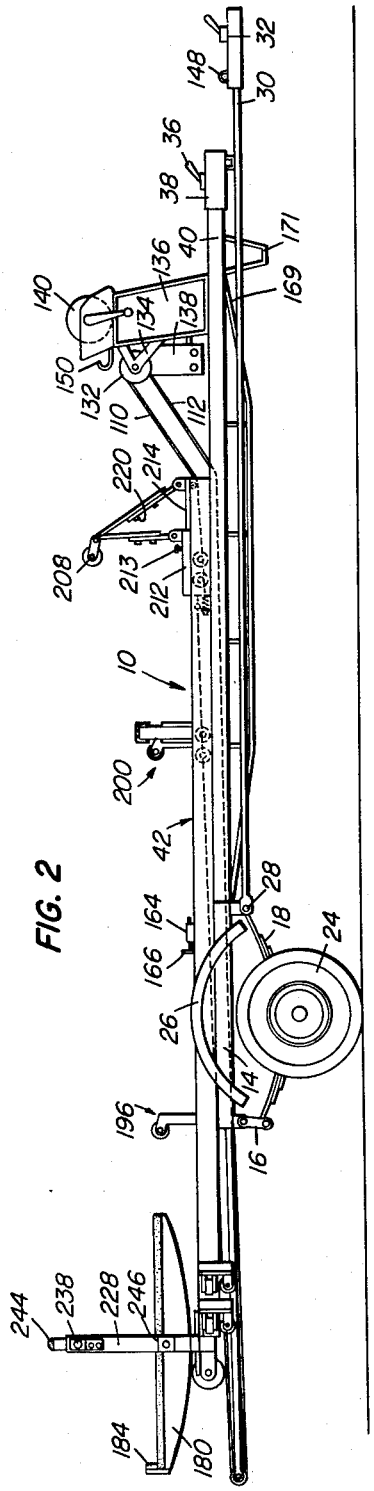
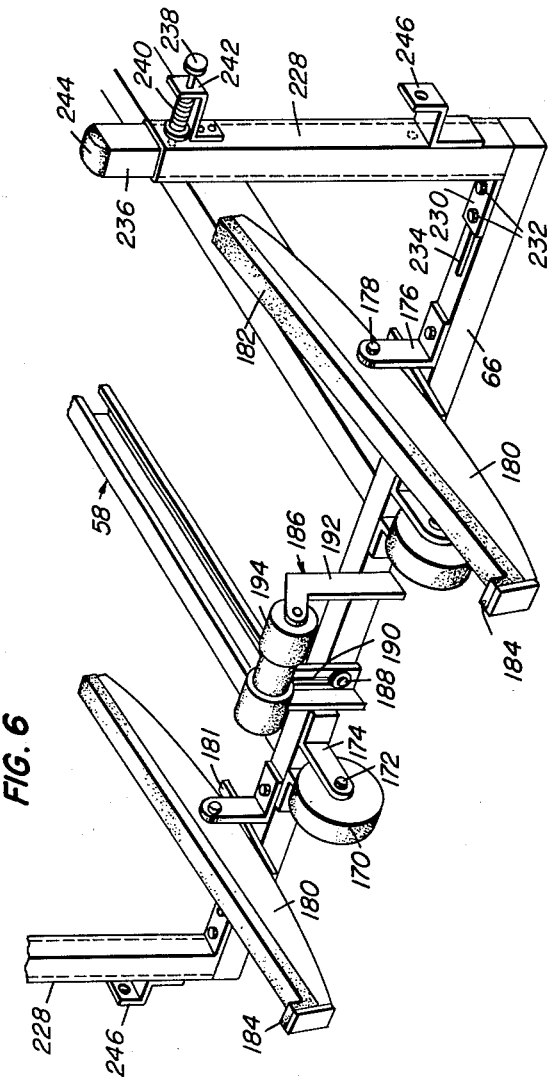
INVENTOR
Jack E. Horner
BY Justave Miller
ATTORNEY

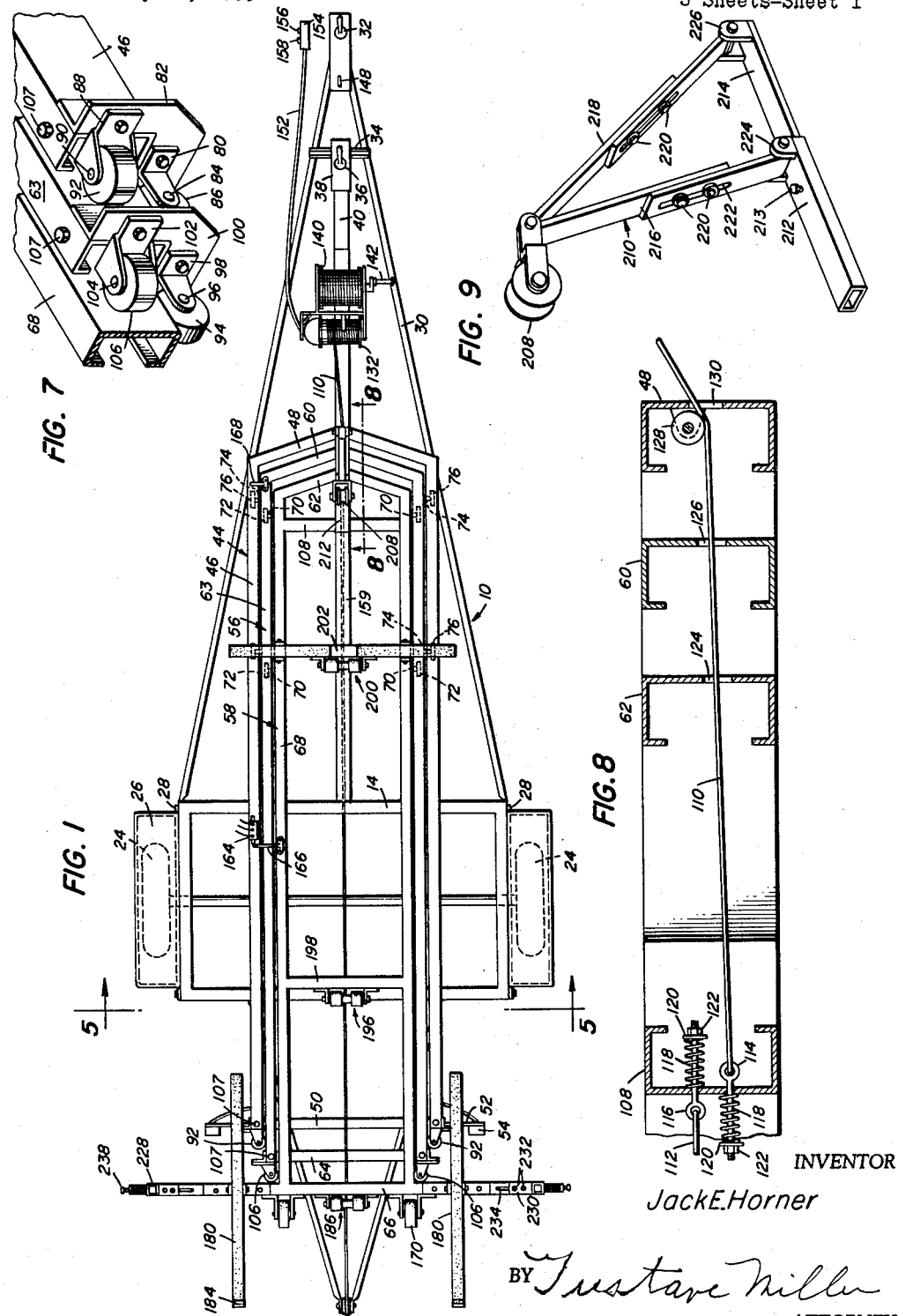

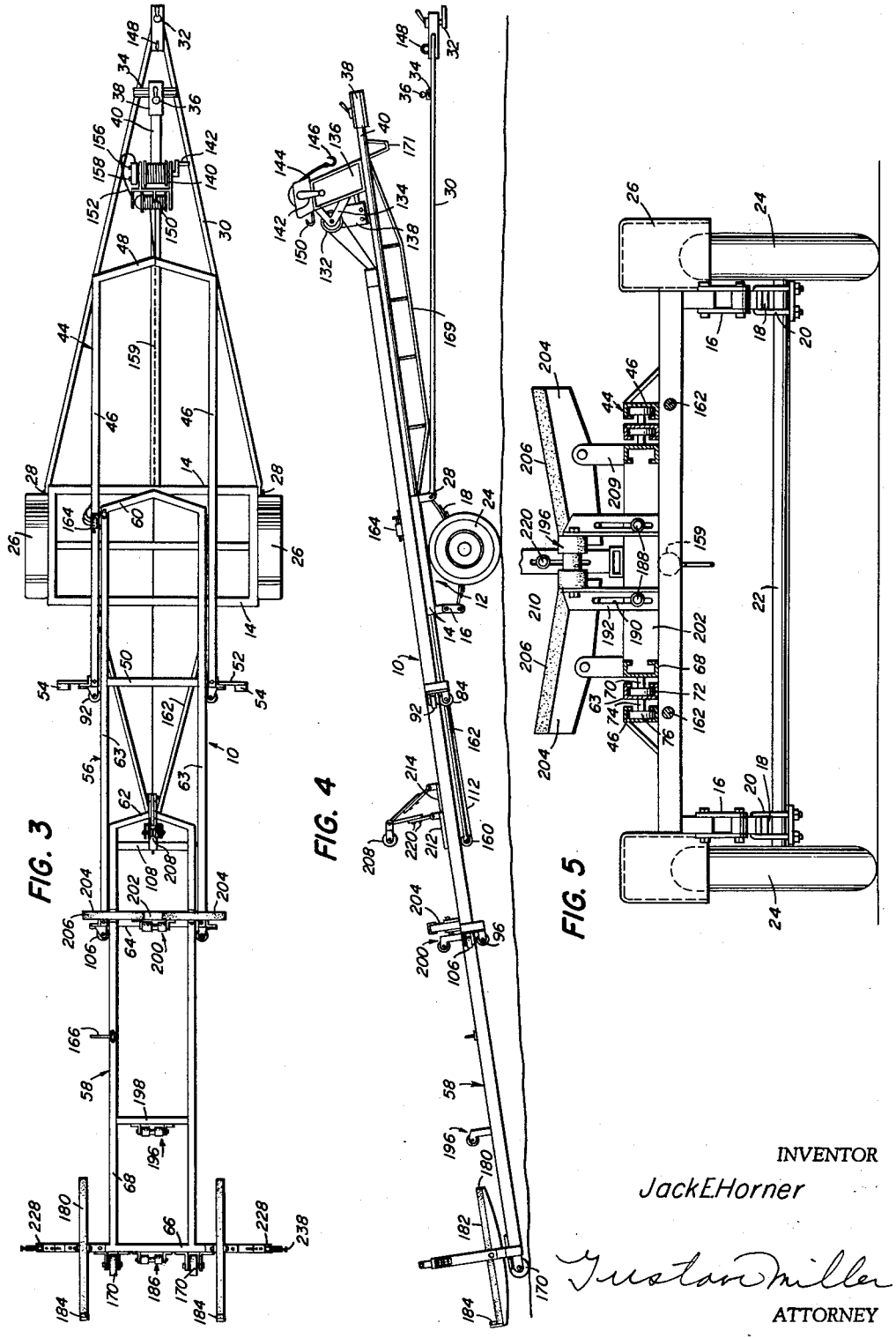

United States Patent Office

3,140,003
Patented July 7, 1964

3,140,003
TELESCOPIC BOAT TRAILER
Jack E. Horner, Jacksonville, Fla.
(Hibernia Rte., Green Cove Springs, Fla.)
Filed May 10, 1963, Ser. No. 279,400
12 Claims. (Cl. 214—505)

This invention relates to an extendible and retractable boat trailer, and has for an object to provide an improved extendible and retractable boat trailer for carrying a boat, which trailer may be temporarily hitched to an automobile or other vehicle, and wherein the trailer has an extendible and retractable boat carriage frame, so that when the automobile has been brought to the water's edge, the boat carriage frame may be extended outwardly until the boat is fully in the water free of the frame, whereupon the frame may be retracted from under the floating boat back onto the boat carriage frame, and vice versa when the boat is to be picked up, the boat carriage frame may be extended out into the water so that the boat may be readily centered thereover and then the boat, with the extendible boat carriage frame, may be readily retracted back onto the supporting wheels of the boat trailer.

A further object of this invention is to provide a boat trailer having an extendible and retractable boat carriage frame, and provided with a winch and cable for positively extending and retracting the boat carriage frame into or out of the water for either launching the boat or picking up the boat, and wherein the winch may be electrically operated, and thus reduce manual labor connected therewith to an absolute minimum.

Still a further object of this invention is to provide an extendible and retractable boat trailer which includes a rigid frame having a hitch cooperating means to which is pivotally attached a wheel carriage base frame, the wheel carriage base frame having a supporting frame rigidly secured thereto, a second frame telescopically extendible into and out of the first frame and a third frame, which is a boat carriage frame and is extendible into and out of the other extendible frame.

Still a further object of this invention is to provide an extendible or telescopic boat carrying trailer having a boat carrying frame extendible to and from a wheel carriage base frame, and tiltably secured to a hitch cooperating tow member and means for tilting it down to the plane of the tow member so that the boat carriage frame with the boat thereon may be readily secured in position.

With the foregoing and other objects in view, this invention comprises the combination, construction and arrangement of parts hereinafter set forth, claimed, and disclosed in the accompanying drawings wherein:

FIG. 1 is a top elevation of view of the telescopic trailer of this invention in retracted position.

FIG. 2 is a side elevation of FIG. 1.

FIG. 3 is a top elevation of view, on a smaller scale, of the trailer in extended position.

FIG. 4 is a side elevation of view of FIG. 3, showing the telescopic frame means in tilted position.

FIG. 5 is a section view on line 5—5 of FIG. 1.

FIG. 6 is a perspective view of the details of the rear end of the boat carriage frame.

FIG. 7 is a fragmentary perspective view of the load and guide bearing wheels at the rear end of the trailer frames.

FIG. 8 is an enlarged section view on line 8—8 of FIG. 1, showing the tension take-up fastening means of the winch cables to the boat carriage frame member.

FIG. 9 is an enlarged perspective view of the adjustable bracket carrying the bow abutting buffer spool.

There is shown at 10 the telescopic boat trailer of this invention. This boat trailer 10 includes a wheeled base frame 12 consisting of transversely extending rectangular frame 14 supported by spring shackles 16 on bowed leaf springs 18 which are fastened by U bolts 20 to a wheel axle 22 on the ends of which are journaled rubber tired wheels 24. Conventional mudguards 26 are secured to the opposite sides of the base frame 14 in a position over the wheels 24.

Secured by the pivots 28 at the front end of the rectangular base frame 14 are the divergent legs of a V-shaped tow member 30 provided with a tractor hitch coupling 32 of conventional construction for cooperating with a conventional hitch coupling mounted at the rear of towing automobile or other tractor vehicle (not shown). Adjacent the apex of the V-shaped tow member 30 is mounted a cross-bar 34 having a latch 36 thereon for securing thereto a latch element 38 mounted at the front end of a forwardly extending arm 40 rigidly secured to the rectangular base frame 14 and parallel therewith. Mounted on the rectangular base frame 14 of the wheeled base frame 12 and on the forwardly projecting arm 40 in a plane parallel thereto is a telescopic frame means generally shown at 42. This telescopic frame means 42 includes a frame member 44 rigidly secured in any suitable manner to the rectangular base frame 14 and the forwardly projecting arm 40.

This rigid frame member 44 is substantially rectangular in outline including two opposite side bars 46, a somewhat angular front cross-bar 48, in the same plane therewith, and a rear cross-bar 50 secured, below the plane thereof, to the rear ends of the side-bars 46 at the bottom thereof, the side-bars 46 and the angled front bar 48 in themselves forming a somewhat U shape. The side-bars 46 and the angled front-bar 48 are C shaped in cross section as illustrated in FIGS. 5, 6, 7 and 8. Obviously, inasmuch as the side-bars 46 and the angled front-bar 48 form a V, it is apparent that the angled bar 48 instead of being composed of two sections meeting at a middle forwardly projecting angle, could instead be smoothly curved.

Extending from opposite ends of the rear cross-bar 50 of the rigidly secured frame member 44 is a bracket 52 on the end of which is mounted a conventional tail light and stop light 54 connected in a conventional manner to the conventional circuits from the source of electricity located in the tractor vehicle, the details of the circuits from the tractor vehicle to the trailer 10 being conventional and hence shown only in fragments where necessary to the understanding.

Telescopically slidable within the rigidly secured frame member 44 there is an intermediate telescopic frame member 56 and likewise telescopically slidable within the intermediate frame member 56 is a boat carriage frame member 58. Each of the frame members 56 and 58 have similarly angled front cross-bars 60 and 62 similar to the angle front cross-bar 48 of frame member 44. The intermediate telescopic frame member 56 is provided adjacent its rear with a straight cross-bar 64 extending across the top of the ends of its opposite side bars 63 while the boat carriage telescopic frame member 58 is provided with a straight rear cross-bar 66, the straight rear cross-bar 66 being secured in the same plane with and across the rear ends of its opposite side-bars 68. It is the fact that the rear cross-bars 64 and 66 are each in different planes that permits intermediate frame member 56 and the boat carriage frame member 58 to telescope into and out of the rigidly secured frame member 44.

In order that the boat carriage frame 58 may telescope in the intermediate telescopic frame 56 and this intermediate frame 56 may in turn telescope in the frame member 44 rigidly secured on the rectangular base frame 14, a plurality of appropriately positioned pairs of bearings are journaled on at least two of the frame members to provide bearing supports for the next adjacent frame members. As already brought out, each frame member is C-shaped in cross-section, that is, it has a vertical back side, top and bottom horizontal sides and vertical flanges spaced apart providing a channel therebetween. This C-shape of the channel bars of the frame members is clearly visible in FIGS. 5, 6, 7 and 8.

As shown in FIG. 1, the backs of the opposite side bars 68 of boat carriage frame member 58 are each provided with two bearing journals 70, which extend through the open channel of the opposite side-bars 63 of the intermediate telescopic frame member 56, and within the C-shaped channels each journal member 70 rotatably carries a load bearing wheel 72 telescopically supporting the forward end of the boat carriage frame member 58 in the sides 63 of the intermediate telescopic frame member 56. Similar journal members 74, rigidly secured on the outer sides of the opposite side 63 of the intermediate telescopic frame member 56, extend into the open channels of the opposite side-bars 46 of the rigidly secured frame member 44 with the bearing wheels 76 supported thereon and riding in the channel provided by the sides 46 to carry the load thereof. Each of the upper rearward ends of the opposite sides 46, as illustrated in FIG. 7, is provided with a bracket 80 detachably bolted thereto on a flange plate 82 and has a journal 84 thereon for a load supporting wheel 86 on which the bottom side of the side-bar 63 rides, while a second bracket 88, has journaled therein at 90 a guide bearing wheel 92 riding against the vertical side of intermediate telescopic frame member side-bar 63.

The same type of load bearing wheel 94 journaled at 96 in a bracket 98 removably bolted on an end flange 100 on the end of the intermediate telescopic frame side-bar 63, is provided, as well as a similarly bolted second bracket 102 with the journal 104 for the guide wheel 106 bearing against the side of the boat carrying frame member side bar 68. With this construction on both ends of the frames and the bearings on the forward ends of the frame, it is obvious that the boat carriage frame 58 will telescope readily into intermediate telescope frame 56 which in turn telescopes readily into and out of a rigidly secured frame member 44.

Removable bolts 107 extending vertically through the ends of side-bars 46 and 63 limit the travel of the load bearing wheels 72 and 76 and thus present accidental separation of the telescopic frames. Should separation be necessary, bolts 107 and guide brackets 88 and 102 are removed permitting ready separation of the telescopic frames 56 and 58 from rigid base frame 44.

In order to controllably extend and retract the intermediate telescopic frame member 56 and the boat carriage frame 58, the boat carriage frame 58 is provided adjacent its forward end with a cross bar 108 rigidly secured thereto. Winch cables consisting of a retracting winch cable 110 and an extending winch cable 112 are anchored to the cross-bar 108 by a tension maintaining means consisting in each case of an eye bolt 114 and 116 extending in opposite directions through the cross-bar 108, and provided on the side of the bar 108 opposite from the eye of the bolts with compression springs 118 biased between the cross-bar 108 and washers 120 adjustably positioned by means of nuts 122 threaded on the ends of the eye bolts 114 and 116.

The retracting winch cable 110 extends through centrally located openings 124 in the front end bar 62, opening 126 in the front end bar 60, and bears against a roller 128 journaled in the front end bar 48 and passes through opening 130 to an electrically operable winch 132. Winch 132 is supported on a bracket 134 extending from an upright support 136 on the forwardly projecting arm 40 of the rigidly secured frame member 44. An electric motor 138 for the winch 132 is likewise supported on the same upright support 136. Also supported on the upright support 136 is a second winch 140, which is hand operable by a crank handle 142, and is provided with a winch cable 144 having a hook 146 adapted to be secured in an eye 148 mounted on the hitch cooperating coupling 32 so that when the frames have all been retracted with or without the boat thereon, the retracted telescopic frames may be drawn down into the plane of the V-shaped tow member 30, the center of gravity of the loaded or unloaded retracted telescopic frame means 42 being so close to the pivots 28 that it may remain in titled position unless positively brought down to a plane parallel to the V-shaped tow member 30 and then it is secured in such position by the cooperating latch 36 and latch element 38.

Also mounted on the same support 136 is an anchor hook 150. This anchor hook 150 is intended for cooperation with an anchor rope, not shown, on the boat that is to be carried, the anchor rope being extended from the boat being of such length so that it will just reach the hook 150 when the boat is in proper position on the extended boat carriage frame as will be later described.

The electric motor 138 has a circuit thereto connected in a conventional manner through the hitch coupling to the battery or source of electricity on the tractor vehicle or automobile for towing the trailer, and this circuit extends through a circuit control line 152, the circuit control line 152 being retractably reeled in a switch box 154, having advance and retract buttons 156 and 158. This reel switch box 154 is of conventional construction so that the switch box buttons 156 and 158 may be operated irrespective of whether the circuit control line 152 is reeled in or out of the switch box 154. The switch box 154 is detachably supported by cooperating hook members, not shown, on the upright support 136 and when detached therefrom the switch box may have the control circuit line 152 unreeled therefrom and the switch box 154 may be brought into the towing automobile or tractor vehicle so as to provide remote control for extending or retracting the telescopic frame members, particularly when the boat is being launched into or out of the water where the wheels 24 may be located in the water beyond the edge thereof.

The other winch cable 112 of the electric winch 132 extends through a longitudinal tubular bar 159 forming a reinforcement for the rigid frame member 44 and extends beneath the front bar 48 through rigid base frame 14, and then extends thereunder and about a pulley 160 mounted at the apex of a V-frame 162 rigidly extending from the rear side of the rectangular base frame 14. In extended position the cross-bar 108, to which the ends of the winch cables 110 and 112 are secured by the tension means shown in detail in FIG. 8, is substantially just above the position of the pulley 160, so that as the winch cable 112 is wound up on the winch 132 the telescopic frames are extended, winch cable 110 being simultaneously unwound and then, when reversed, the winch cable 112, unwinds from the winch cable 132 while the retracting winch cable 110 winds up on the winch 132. In the size illustrated, the winch is provided with fourteen lays, twelve of which are occupied by the wound-up cable and two of which are occupied by the unwound cable and as the winch 132 is rotated one way or the other, one cable unwinds from a lay while the other cable winds onto the lay made bare by the unwinding cable.

Included in the circuits through the advance and retract buttons 156 and 158 of the switch box 154 is a limit switch 164 mounted on one side bar 46 of the rigid frame member 44. A switch cut-off operating arm 166 is mounted on one side bar 68 of the boat carriage frame 58 so that when it reaches retracted position it will operate the switch 164 to interrupt the circuit to the cable winch motor 138 at the fully retracted position. A second switch cut-off operating arm 168 is mounted on the corresponding side bar 63 of the intermediate telescopic frame member 56 so that as the frames are extended, this cut-off operating arm 168 will contact the switch 164 at the maximum advanced position and cut off power through the advance button 156 of the control box 154, thus insuring that the motor 138 will stop at the maximum extended and the maximum retracted positions of the telescopic frame members.

A reinforcing truss 169 extends along the bottom of the forwardly projecting arm 40 to help carry the load, and adjacent the forward end of the projecting arm 40 there is provided a foot 171 to carry the load when the V-shaped tow member 30 is not coupled to a tractor vehicle but instead rests on the ground therebeneath. To carry the load of the other end of the trailer particularly as it is in the process of being extended or retracted, a pair of supporting wheels 170 are journaled on axles 172 on bracket arms 174 extending from the rear side of the rear cross-bar 66 of the boat carriage frame 58. This same cross-bar 66 also has, on its top, side bracket members 176 on which are pivoted at 178 longitudinally extending boat stern carrying supports 180 provided on the upper surfaces with cushions 182. The rear ends of the supports 180 are provided with cushioned upwardly extending fingers 184 to hook against the stern end of the boat being carried thereon.

A keel supporting roller assembly 186 is adjustably secured to the rear cross-bar 66 by bolts 188 cooperating with slots 190 and a pair of angle arms 192 between which the keel supporting roller or spool 194 is journaled. A similar keel supporting roller assembly 196 is similarly mounted on an intermediate cross-bar 198 between the boat carriage side bars 68 and another boat keel supporting roller assembly 200 is likewise similarly mounted on another intermediate cross-bar 202 somewhat forwardly between the boat carriage frame side bars 68. Also mounted on the same forwardly located cross-bar 202 are a pair of transversely extending spaced-apart pivoted bow supports 204 each provided with a cushion 206 and pivotally supported on brackets 209 extending upwardly from the cross-bar 202.

It will be noted that the pivotal movement of the longitudinally extending supports 180 is limited by the plates 181 therebelow so that they cannot pivot to such a position where they might tend to have their ends abut bottom of the boat as the boat in the water enters onto the boat carriage frame 58.

A bow abutting buffer spool 208 is mounted on a triangular support 210 on a pair of base bars 212 and 214. Base bar 212 is supported on the forward bar 62 and the forward intermediate bar 108 of the boat carriage frame 58, base bar 214 telescoping into bar 212 and held in adjusted position by set screw 213. A degree of adjustability is provided for the position of the bow buffer spool 208 by the fact that the two upwardly extending arms 216 and 218 of the triangular 210 are each made in two pieces connected together by bolts 220 through aligned slots 222 in each of these two arms, while the lower ends of the arms 216 and 218 are pivotally secured between the ears 224 of the bar 212 and the ears 226 of the bar 214, as well as by telescoping bar 212 into bar 214.

Boat chine side guide members 228 are secured adjustably on the rear cross-bar 66 of the boat carriage frame 58 by having a transversely extending toe 230 through which bolts 232 are secured through the slots 234 in cross-bar 66. The guide members 228 are hollow, and extendibly telescoped within each of the guide members 228 is the guide post 236 which may be manually lifted and then held in the raised position by a plunger 238, spring pressed at 240 and mounted through a bracket 242 and projecting into suitable positioned apertures in the side of the guide post 230, so that the post is held in the extended lifted position, as when serving to guide the boat onto the carriage when loading the same from the water, and retracted at all other times.

A cushion top 244 is secured on the top end of the guide post 236 to facilitate gripping the same. A tie down ear 246 is secured to the bottom of each guide member 228 so that a line from the boat may be tied thereto to help stabilize the boat when being carried thereon.

In operation, the boat may be carried by this boat trailer 10 towed behind a tractor vehicle or automobile with the electrical circuits thereto connected in a conventional manner, with the cooperating coupling 32 of the trailer 10 secured to a cooperating coupling on the tractor vehicle or automobile. When the boat is to be launched into the water, the vehicle and the trailer 10 are backed until the trailer wheels 24 may enter the water if desired while the rear wheels of the automobile or tractor vehicle may be stopped at the water's edge. However, before this is done, the switch box 154 will have its circuit control line 152 unreeled so that the switch box 154 may be brought into the automobile. Then with the anchor cable of the boat hooked on the anchor hook 150, the advance button 156 will be operated, the anchor line being simultaneously unreeled from the boat, while the electric winch 132 advances the boat carriage frame 58 and the intermediate telescopic frame 56 into the water, both telescopic frames and the rigid base frame 14 pivoting about the pivots 28 as the boat and telescopic frames have their center of gravity pass therebeyond to tilt over as a unit and enter into the water, the rear wheels 170 of the frame contacting the bottom of the water if necessary. The boat carriage frame 58 is advanced into the water until the boat starts to float, whereupon the advance button 156 may be released stopping the operation. The boat is then permitted to float beyond the boat carriage frame 158 within the limit of its anchor line to the anchor hook 150, and when the boat has cleared the boat carriage frame, the retract button 158 is operated to reverse the rotation of the electric winch motor 138 and pull in the empty boat carriage frame 58 and the intermediate telescopic frame 56 onto the rigid frame 44 until the stop limit switch 164 is abutted by the switch cut-off operating arm 166. Then, if necessary, the hand winch 140 has its winch cable 144 connected by hook 146 to the eye 148 to tilt the boat back to a plane parallel to that of the V tow member 30, and then is latched thereto by the cooperating latch and latch members 36 and 38, whereupon the boat trailer 10 may be pulled away from the water's edge.

To pick up the boat from the water, the guide posts 236 are first raised and supported in their upper position, the switch box 154 is brought to the tow vehicle and then the empty boat trailer is advanced into the water in the limit permitted by the towing vehicle rear wheels approaching the water's edge. The advance button 156 is then operated to advance the boat carriage frame 58 as far as necessary up to the limit of the operation of the stop switch arm 168 contacting the limit switch 164. The boat is then floated over the boat carriage frame 58 until its bow abuts the bow buffer spool 208, the extendible side guide members 228 having first been raised before the trailer 12 is extended, serving to guide the sides of the boat if necessary so that the keel of the boat rides over the roller assemblies 186, 196 and 200 on the bottom of the boat until the boat abuts the bow buffer spool 208 and rests on the cushioned pivoted supports 204 and 180, with the hook ends 182 extending just beyond the stern wall of the boat to hold it in position. Then, with the anchor line hooked on to anchor hook 150, it may be reeled in the boat as the electric winch 132 is operated by the retract button 158 to retract the boat carriage frame 58 and the intermediate telescopic frame 56 on to the rigid frame 44 and then when it is in fully retracted position, the operation of the winch 132 is stopped by switch operating cut-off arm 166 contacting the limit switch 164, and the hand winch 140 can then be operated to tilt the boat carriage frame 58 to a position parallel to plane of the V-tow member 30 and the latch 36 and 38 is operated to secure it in position.

While the device has been shown and the structure described in detail, it is obvious that this invention is not to be considered as being limited to the exact form disclosed and changes in detail and construction may be made therein within the scope of what is claimed, without departing from the spirit of this invention.

Having thus set forth and disclosed the nature of this invention what is claimed is:

1. A telescopic boat trailer comprising a wheeled base frame, a tow V-frame having hitch cooperating means at its apex, means pivotally securing said wheeled base frame to the divergent ends of said V-frame, and rearwardly extendible and retractable telescopic frame means mounted on said wheeled base frame, said telescopic frame means comprising a frame member rigidly secured to said wheeled base frame, an intermediate frame member telescopically mounted on said rigidly secured frame member, and a boat carriage frame member telescopically mounted on said intermediate frame member, a forwardly extending arm rigidly secured to said rigidly secured frame member, winch means mounted on said arm, cable means wrapped about said winch means, secured to the forward end of said boat carriage frame member, and extending about pulley means supported at the rear of said wheeled base frame member for positively moving said boat carriage frame member between fully extended and retracted positions in either direction, said telescopic frame being tiltable, when in extended positions, downwardly about said pivotal securing means from a plane substantially parallel to the plane of said tow V-frame, and means for securing said retracted telescopic frame means and tow V-frame in parallel planes.

2. The trailer of claim 1, at least two of said frame members having oppositely disposed side bars C-shaped in cross-section, a plurality of spaced bearing means bearing within said C-shaped bars and journaled on support means on the next adjacent frame member side bar.

3. The boat trailer of claim 2, and additional bearing means bearing against outer surfaces of said side bars and journaled on support means on the next adjacent frame member side bar.

4. The boat trailer of claim 1, and a reversible electric motor operatively connected to said winch means for advancing and retracting said telescopic frame means, manually operable control means for said electric motor, and an extendible and retractable circuit cable connecting said manually operable control means to said electric motor.

5. The boat trailer of claim 4, and a circuit to said electric motor including limit switch means cooperatively mounted on said telescopic frame means.

6. The boat trailer of claim 1, said boat carriage frame member including an adjustably mounted boat bow abutting buffer, a pair of transversely extending pivoted bow supports, a plurality of keel supporting rollers, and a pair of longitudinally extending pivoted stern supports.

7. The boat trailer of claim 6, and a stern engaging hook member on ethe rear end of each said pivoted stern support.

8. The boat trailer of claim 6, and boat side engageable guide means transversely and vertically adjustably mounted on the rear end of said boat carriage frame member.

9. The boat trailer of claim 1, and ground engageable wheel means mounted on the rear end of said boat carriage frame member.

10. The boat trailer of claim 1, and winch cable tension means comprising an eye bolt for each end of said cable extending through said boat carriage frame in opposite directions, a nut on each said bolt, and a compression spring on each said bolt between said carriage frame member and cable securing eye of each said eye-bolt.

11. The boat trailer of claim 1, and a truss member secured to the bottom of and reinforcing said rigidly secured frame member and said forwardly extending arm.

12. The boat trailer of claim 11, and a depending leg secured to the bottom of said forwardly extending arm, forwardly of said truss member, for supporting said forward end of said trailer when in retracted, unhitched position.

References Cited in the file of this patent

UNITED STATES PATENTS

| | | |
|---|---|---|
| 2,408,862 | Lisota | Oct. 8, 1946 |
| 2,678,188 | Rogers | May 11, 1954 |
| 3,021,969 | Peak et al. | Feb. 20, 1962 |
| 3,056,520 | Rutigliano | Oct. 2, 1962 |
| 3,097,755 | Fulcher | July 16, 1963 |